No. 859,890. PATENTED JULY 9, 1907.
R. H. READ.
ARC LIGHT ELECTRODE.
APPLICATION FILED OCT. 25, 1902.
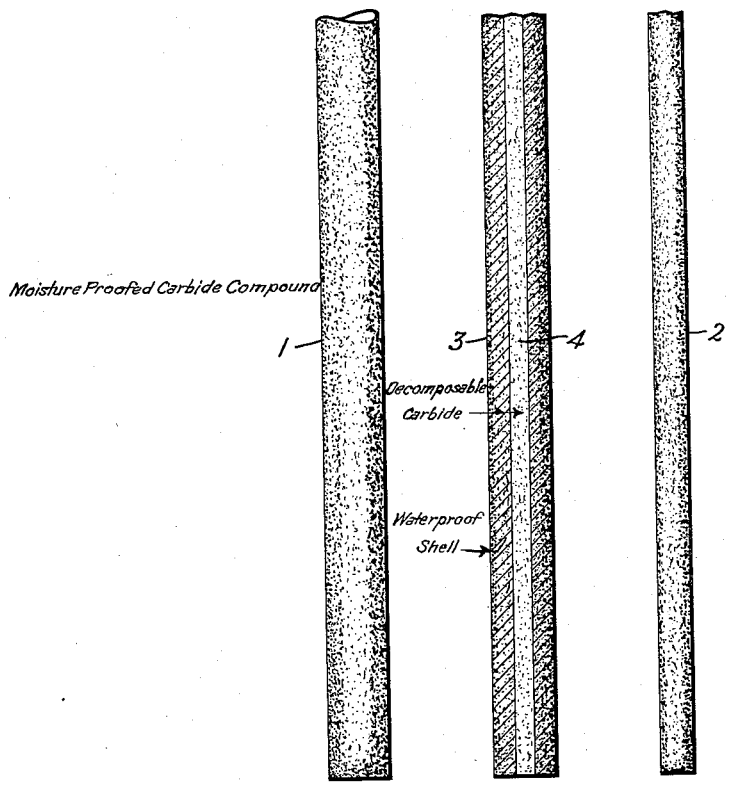
Witnesses.
George W. Tilden.
Alex. F. Macdonald.
Inventor.
Robert H. Read.
by Albert B. Davis,
Att'y.

UNITED STATES PATENT OFFICE.

ROBERT H. READ, OF SCHENECTADY, NEW YORK, ASSIGNOR TO GENERAL ELECTRIC COMPANY, A CORPORATION OF NEW YORK.

ARC-LIGHT ELECTRODE.

No. 859,890.        Specification of Letters Patent.        Patented July 9, 1907.

Original application filed May 18, 1901, Serial No. 60,813. Divided and this application filed October 25, 1902. Serial No. 128,786.

*To all whom it may concern:*

Be it known that I, ROBERT H. READ, a citizen of the United States, residing at Schenectady, county of Schenectady, State of New York, have invented certain new and useful Improvements in Arc-Light Electrodes, of which the following is a specification.

This invention relates to arc lighting, the object being to improve the quality of the light and permit the maintenance of a longer arc with currents of moderate potential and amperage. I have discovered that conducting electrodes for arc lamps formed of the conducting carbids or containing a considerable portion of the same, permit a much longer arc to be drawn with the same potential and current than corresponding electrodes of carbon. The action of the arc is also much smoother than a carbon arc, being remarkably quiet, the tendency of the tips at the arc terminals being to fuse slightly before being vaporized, thus conducing toward a quiet action free from hissing or decrepitation and much more stable than a carbon arc. The color of the light varies with the base of the carbid; for example, an arc containing carbid of calcium has a rich golden color of intense luminosity, whereas one formed of or containing aluminium carbid has a much whiter appearance, the spectrum varying with the nature of the carbid.

I prefer to employ carbids which are unaffected by moisture and therefore do not deteriorate in service when exposed to the atmosphere. For example, carbid of calcium is unsatisfactory for practical service unless mixed with a conducting bond or compound which protects each particle of the carbid from access of moisture; whereas aluminium carbid which is unaffected by moisture at ordinary temperatures does not require such protection.

The present application is directed to the form in which a decomposable carbid is employed, claims for non-decomposable carbids generally, and for aluminium carbid being made in my original application Serial Number 60,813, filed May 18, 1901, of which the present application is a division; and claims for certain other forms of carbid, as for example, titanium, being covered in my divisional application Serial Number 126,669, filed October 10, 1902.

Where carbids of lithium, calcium, strontium, barium, lanthanum, yttrium, thorium and manganese, or generally any carbid which is attackable by cold water is employed, the electrode should be formed of a mixture of ground carbid mixed with coal tar or similar carbonaceous binder baked and raised to incandescence out of contact with air, and then paraffined or similarly protected on the outside from moisture; or such compounds may be employed as a core for a hollow carbon. If cored electrodes are employed care should be observed to protect the core from access of moisture by coating the carbon with paraffin or metal or other moisture-proof material, as the affinity of such carbids as are decomposed by cold water is so strong that moisture is absorbed through the pores of the carbon, and soon splits the electrode along its axis. Much more satisfactory results may however be secured by the carbids of aluminium, chromium, zirconium, molybdenum, titanium, wolfram, which are not attacked by water at ordinary temperatures, or at least very slightly so. I find that carbid of aluminium gives excellent results either when employed pure or when mixed with a carbonizable binder, molded and baked; and by reason of its cheapness and ease of manufacture is most feasible for ordinary uses. It may also be used for a core for a cored carbon.

In preparing the electrodes the material as produced in the electric furnace is finely pulverized and molded in sticks of the desired size by mixing with it about 5 % of a carbonizable binder such as cane sugar or wheat flour, moistened with a small quantity of coal tar or even cold water. After drying and baking at a bright red heat, its structure may be rendered more compact and dense by filling the pores with carbon by any approved process, such for example, as saturating with sugar and again firing, or by raising to a red heat in a hydrocarbon vapor. When burning in an automatic lamp it is desirable to provide for a slight lateral or scraping motion in drawing the arc to rub away the deposit of oxid liable to form at the tips of the electrodes, which is a good non-conductor of electricity. The lateral movement rubs off the thin film of oxid and gives a conductive connection which permits the arc to be struck, after which it is maintained with more stability than an arc between simple carbon electrodes.
A proportional admixture of the carbids with carbon also improves the nature of the light and the stability of the arc.

I find that a comparatively long arc may be maintained with much smaller current when the electrodes are composed of or contain the conducting carbids as above described. The vapor acts as a better conductor and seems to form a thicker arc with the same current than carbon, and the material when cold is a sufficiently good conductor to act as a carrier of current.
When used with an inclosing globe, the lamp in which the electrodes are used should be provided with a wiper for periodically removing the deposit from the walls of the globe or this could be effected by providing a draft through the inclosing globe; the latter expedient however greatly reduces the life of the electrodes and increases the expense of maintenance. I find that with electrodes of carbid of calcium or carbid of aluminium, for example, a good arc from $\frac{1}{4}$ to $\frac{3}{8}$ inches in length may be maintained by a current of one ampere with a drop across the arc of 50 volts, thus giving an energy consumption of 50 watts per unit of light, and yielding a brilliant, steady and uniform light.

In the accompanying drawings, Figures 1 and 3 illustrate elevations of arc light pencils of different sizes formed according to my invention; Fig. 2 shows a cored electrode.

The electrodes may consist of sawed sticks of a crystalline carbid or may be composed of a carbonized compound of the carbid and the carbonaceous material, as above set forth; 1 representing an electrode suitable for a 5-ampere lamp, and 2 one suitable for a 1-ampere lamp.

3 represents a hollow carbon pencil, and 4 a core of conducting carbid compound, as above described.

What I claim as new and desire to secure by Letters Patent of the United States is,

1. As a new article of manufacture, an arc lamp electrode of carbid having a covering envelop impervious to water to protect the electrode against the decomposing action of the moisture of the air.

2. As a new article of manufacture, an arc lamp electrode of carbid having a solid metal envelop protecting the carbid from moisture.

3. An arc light carbid electrode, containing carbid decomposable by water and conducting substances incorporated in the body of the carbid, and a superficial coating of a body impervious to water.

4. An arc light carbid electrode, containing carbid of calcium, a conducting substance incorporated in the body of the carbid, and a superficial coating of a body impervious to water.

5. An arc light carbid electrode, containing calcium carbid and carbon mixed therewith, and a superficial coating of a body impervious to water.

6. An arc light carbid electrode containing carbid of calcium, a conducting substance incorporated in the body of the carbid, and a protective coating of a body impervious to water.

7. As a new article of manufacture, an arc lamp electrode containing carbid having a covering envelop impervious to water to protect the electrode against the decomposing action of the moisture of the air.

8. As a new article of manufacture, an arc lamp electrode containing a carbid decomposable by cold water having a covering envelop impervious to water to protect the electrode against the decomposing action of the moisture of the air.

9. As a new article of manufacture, an arc lamp electrode containing carbid having a solid metal envelop protecting the carbid from moisture, substantially as described.

10. As a new article of manufacture, an arc lamp electrode containing a carbid decomposable by cold water, having a protective envelop of metal.

11. An arc light electrode containing a conducting carbid and a conducting binder intimately associated throughout the mass.

12. An arc light electrode containing a conducting carbid and a carbonized binder intimately associated throughout the mass.

13. An arc lamp electrode comprising a carbon pencil cored with a conducting carbid intimately associated with a conducting binder throughout the mass of the core.

14. An arc light electrode comprising a carbon pencil cored with a carbid decomposable by cold water, intimately associated with a carbonized binder throughout its mass.

15. An arc light electrode comprising a carbon pencil cored with carbid of calcium intimately associated with a conducting binder throughout its mass.

16. An arc light electrode formed of granular conducting carbid united by a conducting binder.

17. An arc light electrode formed of molded material containing carbon and a conducting carbid.

18. An arc light electrode containing granular or finely divided conducting carbid having its pores filled with carbon.

19. An arc light electrode containing a conducting carbid having its particles bound together by a small percentage of carbon.

20. An electrode, comprising a carbid and a carbon binder, as set forth.

21. An electrode, comprising a carbid and a coked binder, as set forth.

22. An electrode, comprising calcium carbid and a carbon binder, as set forth.

23. An electrode, comprising calcium carbid and a coked binder, as set forth.

In witness whereof I have hereunto set my hand this 24th day of October, 1902.

ROBERT H. READ.

Witnesses:
  ALEX. F. MACDONALD,
  GENEVIEVE HAYNER.